(No Model.)
A. T. SEARS.
SHAFT SUPPORT FOR VEHICLES.
No. 393,523. Patented Nov. 27, 1888.
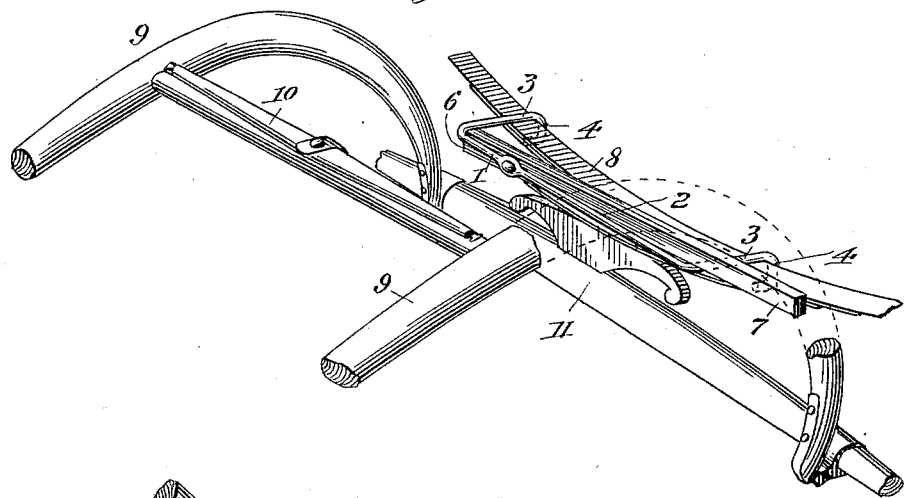
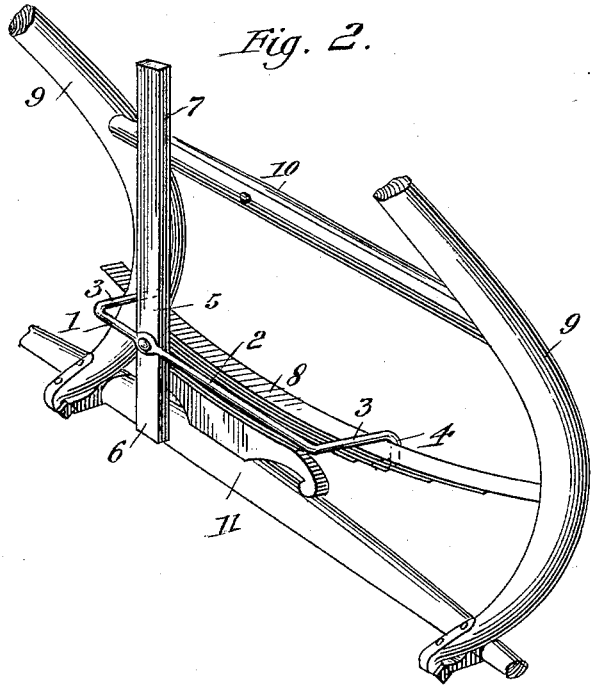

UNITED STATES PATENT OFFICE.

ANDREW T. SEARS, OF BRIDGEPORT, CONNECTICUT.

SHAFT-SUPPORT FOR VEHICLES.

SPECIFICATION forming part of Letters Patent No. 393,523, dated November 27, 1888.

Application filed April 5, 1888. Serial No. 269,646. (No model.)

*To all whom it may concern:*

Be it known that I, ANDREW T. SEARS, of Bridgeport, in the county of Fairfield and State of Connecticut, have invented a new and Improved Carriage-Shaft Adjuster, of which the following is a full, clear, and exact description.

This invention relates to a device for holding up out of the way the shafts of a vehicle when not in use, and has for its object to provide such a device which will be simple and effective.

The invention will be set forth in the following description and claims.

Reference is to be had to the accompanying drawings, forming a part of this specification, in which similar figures of reference indicate corresponding parts in both the figures.

Figure 1 represents the invention applied to the front spring of a vehicle before the shafts are raised, and Fig. 2 illustrates it in position supporting the shafts.

In the construction of the invention a frame, 1, is employed, formed, preferably, of a bar or rod of iron, 2, the arms 3 bent at right angles thereto and having hooked ends 4. To the bar 2 is pivoted a bar, 5, of wood or other suitable material, having a short arm, 6, and a long arm, 7. The bar 5 is pivoted to the portion 2 of the frame 1, preferably near one end thereof, so that it may fold upon the frame 1 nearly horizontal with the bar 2.

In use the hooked ends 4 are engaged with the spring 8 of a vehicle, or the front cross-bar, where side springs are used, and the bar 5 folded up on the frame 1, as shown in Fig. 1. The shafts 9 are then raised and the bar 5 swung up with its long arm, 7, in front of the cross-bar 10 of the shafts, and its short arm projecting against the front axle, 11, of the vehicle. The shafts 9 are thus held up by means of the cross-bar 10 resting against the long arm 7 of the bar 5 and the short arm 6 of bar 5 resting against axle 11, as shown in Fig. 2.

I do not intend to confine myself to the exact construction of the device as herein shown and described, as it may be varied without departing from the essential features of the invention.

This invention will be found extremely serviceable and durable, as it is capable of securely supporting shafts of any weight.

Having thus fully described my invention, I claim as new and desire to secure by Letters Patent—

1. A carriage-shaft-adjuster consisting of a frame with means for attaching it to a carriage-spring or cross-bar, and a bar pivoted to the frame for engaging and supporting a pair of shafts, substantially as shown and described.

2. A carriage-shaft adjuster consisting of a frame, 1, formed with the bar 2 and the arms 3 with hooked ends 4, and a bar, 5, pivoted to the bar 2 adjacent to one of its ends and having the short arm 6 and long arm 7, substantially as shown and described.

ANDREW T. SEARS.

Witnesses:
EDWARD W. CADY,
J. L. MCAULIFFE.